United States Patent
Zhu et al.

(10) Patent No.: US 8,971,169 B2
(45) Date of Patent: *Mar. 3, 2015

(54) SCATTERED PILOT PATTERN AND CHANNEL ESTIMATION METHOD FOR MIMO-OFDM SYSTEMS

(71) Applicant: BlackBerry Limited, Waterloo (CA)

(72) Inventors: Peiying Zhu, Kanata (CA); Wen Tong, Ottawa (CA); Jianglei Ma, Kanata (CA); Ming Jia, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/249,127

(22) Filed: Apr. 9, 2014

(65) Prior Publication Data

US 2014/0314183 A1     Oct. 23, 2014

Related U.S. Application Data

(63) Continuation of application No. 13/765,523, filed on Feb. 12, 2013, which is a continuation of application No. 13/586,660, filed on Aug. 15, 2012, now Pat. No. 8,406,118, which is a continuation of application No.

(Continued)

(51) Int. Cl.
*H04J 11/00* (2006.01)
*H04L 27/00* (2006.01)

(Continued)

(52) U.S. Cl.
CPC .............. *H04L 27/2627* (2013.01); *H04B 7/04* (2013.01); *H04B 7/0684* (2013.01);

(Continued)

(58) Field of Classification Search
CPC ............ H04L 25/0212; H04L 25/0228; H04L 27/2647; H04L 25/0204; H04L 25/02; H04L 1/06; H04L 5/0048; H04L 25/0222; H04L 25/0232

See application file for complete search history.

(56) References Cited

U.S. PATENT DOCUMENTS

| 4,346,470 A | 8/1982 | Alvarez et al. |
| 4,675,863 A | 6/1987 | Paneth et al. |

(Continued)

FOREIGN PATENT DOCUMENTS

| CA | 2554778 | 9/2005 |
| CA | 2603148 | 10/2006 |

(Continued)

OTHER PUBLICATIONS

Extended European Search Report issued in European Application No. 14164460.9 on Jun. 6, 2014.

(Continued)

*Primary Examiner* — Melanie Jagannathan
(74) *Attorney, Agent, or Firm* — Fish & Richardson P.C.

(57) ABSTRACT

A method and apparatus are provided for reducing the number of pilot symbols within a MIMO-OFDM communication system, and for improving channel estimation within such a system. For each transmitting antenna in an OFDM transmitter, pilot symbols are encoded so as to be unique to the transmitting antenna. The encoded pilot symbols are then inserted into an OFDM frame to form a diamond lattice, the diamond lattices for the different transmitting antennae using the same frequencies but being offset from each other by a single symbol in the time domain. At the OFDM receiver, a channel response is estimated for a symbol central to each diamond of the diamond lattice using a two-dimensional interpolation. The estimated channel responses are smoothed in the frequency domain. The channel responses of remaining symbols are then estimated by interpolation in the frequency domain.

25 Claims, 7 Drawing Sheets

Related U.S. Application Data

12/468,624, filed on May 19, 2009, now Pat. No. 8,254,246, which is a continuation of application No. 11/819,690, filed on Jun. 28, 2007, now Pat. No. 7,545,734, which is a continuation of application No. 10/038,883, filed on Jan. 8, 2002, now Pat. No. 7,248,559.

(60) Provisional application No. 60/329,509, filed on Oct. 17, 2001.

(51) Int. Cl.

| | | |
|---|---|---|
| *H04L 27/26* | (2006.01) | |
| *H04B 7/04* | (2006.01) | |
| *H04B 7/06* | (2006.01) | |
| *H04L 1/06* | (2006.01) | |
| *H04L 5/00* | (2006.01) | |
| *H04L 25/02* | (2006.01) | |

(52) U.S. Cl.
CPC ........... *H04L 1/0618* (2013.01); *H04L 5/0023* (2013.01); *H04L 5/0048* (2013.01); *H04L 25/0204* (2013.01); *H04L 25/022* (2013.01); *H04L 25/0234* (2013.01); *H04L 25/0244* (2013.01); *H04B 7/0413* (2013.01); *H04L 27/2602* (2013.01)
USPC ........... 370/208; 370/328; 370/335; 370/342; 370/441; 375/299

(56) References Cited

U.S. PATENT DOCUMENTS

| | | | |
|---|---|---|---|
| 4,817,089 | A | 3/1989 | Paneth et al. |
| 4,912,705 | A | 3/1990 | Paneth et al. |
| 5,022,024 | A | 6/1991 | Paneth et al. |
| 5,119,375 | A | 6/1992 | Paneth et al. |
| 5,121,391 | A | 6/1992 | Paneth et al. |
| 5,657,358 | A | 8/1997 | Panech et al. |
| 5,687,194 | A | 11/1997 | Paneth et al. |
| 5,734,678 | A | 3/1998 | Paneth et al. |
| 5,867,478 | A | 2/1999 | Baum et al. |
| 5,887,261 | A | 3/1999 | Csapo et al. |
| 6,014,374 | A | 1/2000 | Paneth et al. |
| 6,282,180 | B1 | 8/2001 | Paneth et al. |
| 6,298,035 | B1 | 10/2001 | Heiskala |
| 6,353,602 | B1 | 3/2002 | Cheng et al. |
| 6,359,938 | B1 | 3/2002 | Keevill et al. |
| 6,393,002 | B1 | 5/2002 | Paneth et al. |
| 6,473,393 | B1 | 10/2002 | Ariyavisitakul et al. |
| 6,654,429 | B1 | 11/2003 | Li |
| 6,771,667 | B2 | 8/2004 | Paneth et al. |
| 6,842,440 | B2 | 1/2005 | Paneth et al. |
| 6,954,470 | B2 | 10/2005 | Paneth et al. |
| 6,954,481 | B1 | 10/2005 | Laroia et al. |
| 7,012,882 | B2 | 3/2006 | Wang et al. |
| 7,020,701 | B1 | 3/2006 | Gelvin et al. |
| 7,145,940 | B2 | 12/2006 | Gore et al. |
| 7,248,559 | B2 | 7/2007 | Ma et al. |
| 7,460,466 | B2 | 12/2008 | Lee et al. |
| 7,545,734 | B2 | 6/2009 | Ma et al. |
| 7,551,546 | B2 | 6/2009 | Ma et al. |
| 7,844,687 | B1 | 11/2010 | Gelvin et al. |
| 7,995,454 | B2 | 8/2011 | Geile et al. |
| 8,140,658 | B1 | 3/2012 | Gelvin et al. |
| 8,169,977 | B2 | 5/2012 | Laroia et al. |
| 2002/0003774 | A1 | 1/2002 | Wang et al. |
| 2002/0034213 | A1 | 3/2002 | Wang et al. |
| 2002/0080887 | A1 | 6/2002 | Jeong et al. |
| 2002/0122383 | A1 | 9/2002 | Wu et al. |
| 2002/0144294 | A1 | 10/2002 | Rabinowitz et al. |
| 2002/0181390 | A1 | 12/2002 | Mody et al. |
| 2003/0016621 | A1 | 1/2003 | Li |
| 2003/0072254 | A1 | 4/2003 | Ma et al. |
| 2003/0072255 | A1 | 4/2003 | Ma et al. |
| 2004/0081112 | A1 | 4/2004 | Chen et al. |
| 2004/0181800 | A1 | 9/2004 | Rakib et al. |
| 2004/0190640 | A1 | 9/2004 | Dubuc et al. |
| 2004/0198467 | A1 | 10/2004 | Orlik et al. |
| 2005/0031047 | A1 | 2/2005 | Maltsev et al. |
| 2005/0083888 | A1 | 4/2005 | Smee et al. |
| 2005/0282547 | A1 | 12/2005 | Kim et al. |
| 2006/0203711 | A1 | 9/2006 | Oh et al. |
| 2007/0053282 | A1 | 3/2007 | Tong et al. |
| 2007/0097945 | A1 | 5/2007 | Wang et al. |
| 2008/0037669 | A1 | 2/2008 | Pan et al. |
| 2008/0056119 | A1 | 3/2008 | Dapper et al. |
| 2008/0080459 | A1 | 4/2008 | Kotecha et al. |
| 2008/0125128 | A1 | 5/2008 | Yoo et al. |
| 2008/0139207 | A1 | 6/2008 | Son et al. |
| 2008/0225690 | A1 | 9/2008 | Dapper et al. |
| 2008/0225691 | A1 | 9/2008 | Dapper et al. |
| 2008/0242340 | A1 | 10/2008 | Kang et al. |
| 2008/0253279 | A1 | 10/2008 | Ma et al. |
| 2008/0268833 | A1 | 10/2008 | Huang et al. |
| 2008/0291875 | A1 | 11/2008 | Kang et al. |
| 2008/0305745 | A1 | 12/2008 | Zhang |
| 2009/0067534 | A1 | 3/2009 | Kwak et al. |
| 2009/0104909 | A1 | 4/2009 | Vesely et al. |
| 2009/0161591 | A1 | 6/2009 | Ahmadi et al. |
| 2009/0238303 | A1 | 9/2009 | Mondal et al. |
| 2009/0292570 | A1 | 11/2009 | Fawls et al. |
| 2011/0080893 | A1 | 4/2011 | Fong et al. |
| 2011/0242963 | A1 | 10/2011 | Dapper et al. |
| 2013/0010808 | A1 | 1/2013 | Ma et al. |

FOREIGN PATENT DOCUMENTS

| | | |
|---|---|---|
| EP | 0415810 | 3/1991 |
| EP | 1039684 | 9/2000 |
| EP | 2061173 | 5/2009 |
| WO | 94/11957 | 5/1994 |
| WO | 03/084092 | 10/2003 |
| WO | 2007/053954 | 5/2007 |
| WO | 2008/021062 | 2/2008 |
| WO | 2008/075843 | 6/2008 |
| WO | 2009/002097 | 12/2008 |
| WO | 2009/137295 | 11/2009 |
| WO | 2009/141490 | 11/2009 |
| WO | 2010/002219 | 1/2010 |

OTHER PUBLICATIONS

Office Action issued in Russian Application No. 2012103239 on Apr. 22, 2014; 6 pages.

Notice of Allowance issued in U.S. Appl. No. 13/616,438 on May 12, 2014.

Communication Pursuant to Article 94(3) EPC issued in European Application No. 10182868.9 on Jun. 6, 2014; 9 pages.

Office Action issued in U.S. Appl. No. 13/616,438 on Apr. 16, 2014.

Notice of Allowance issued in U.S. Appl. No. 12/806,185 on Apr. 9, 2014.

U.S. Appl. No. 12/830,909, Jul. 6, 2010, Vrzic.

3GPP TSG-RAN Working Group 1 Meeting 54b; Prague, Czech Republic; Sep. 29-Oct. 3, 2008.

Draft IEEE 802.16m System Description Document, IEEE 802.16m-08/003r1; Apr. 5, 2008.

EN 300 744 V1.1.2; "Digital Video Broadcasting (DVB); Framing Structure, Channel Coding and Modulation for Digital Terrestrial Television"; Aug. 1997.

Fernandez-Getina Garcia, M. Julia et al.; Efficient Pilot Patterns for Channel Estimation in OFDM Systems over HF Channels; pp. 2193-2197.

Jones, V.K.; Raleigh, Gregory C.; "Channel Estimation for Wireless OFDM Systems"; pp. 980-985.

Hunziker et al.; "Feedback-Aided Selective Subspace Retransmission for Outage-Free Spatial Multiplexing"; Information, Communications & Signal Processing; 2007 6th International Conference; Feb. 12, 2008.

Hutter et al.; "On the Impact of Channel Estimation for Multiple Antenna Diversity Reception in Mobile OFDM Systems"; Confer-

(56) References Cited

OTHER PUBLICATIONS ence Record of the Thirty-Fourth Asilomar Conference on Signals, Systems and Computers; Oct. 29-Nov. 1, 2000; pp. 1820-1824.
IEEE 802.16-2004: Part 16 Air Interface for Fixed Broadband Wireless Access Systems; IEEE Computer Society and the IEEE Microwave Theory and Techniques Society; Oct. 1, 2004.
IEEE 802.16e-2005: Part 16: Air Interface for Fixed and Mobile Broadband Wireless Access Systems; Amendment 2: Physical and Medium Access Control Layers for Combined Fixed and Mobile Operation in Licensed Bands; IEEE Computer Society and the IEEE Microwave Theory and Techniques Society; Feb. 28, 2006.
IEEE 802.16/2009; Part 16: Air Interface for Broadband Wireless Access Systems; IEEE Computer Society and the IEEE Microwave Theory and Techniques Society; May 29, 2009.
Islam et al.; "Space-Time Block Coding in MIMO Cognitive Networks with Known Channel Correlations"; Wireless Technology, 2008; EuWiT 2008 European Conference; Jan. 19, 2009.
Langton, Charan; "Intuitive Guide to Principles of Communications: Orthogonal Frequency Division Multiplex (OFDM) Tutorial"; www.complextoreal.com; 2004.
Mincai, Qui; Wenyi, Guo; "The Theories of W-CDMA and CDMA2000 in the Third Mobile Communications System and the Draft for Implementation (II)"; Modern Science & Technology of Telecommunications; No. 11; pp. 24-26; Nov. 2000.
Mohammad Ali Maddah-Ali et al.; "Communication over MIMO X Channels: Interference Alignment Decomposition and Performance Analysis"; IEEE Transactions on Information Theory; vol. 54, No. 8; Aug. 2008; 3457-3470.
Raleigh et al.; "Multivariate Modulation and Coding for Wireless Communication"; IEEE Journal on Selected Areas in Communications; vol. 17, No. 5; May 1999; 16 pages.
Report ITU-R M.2072; "World Mobile Telecommunication Market Forecast" 2005.
Wikipedia; "Orthogonal Frequency-Division Multiple Access"; Jun. 21, 2010.
Wikipedia; "Orthogonal Frequency-Division Multiplexing"; Jun. 22, 2010.
Specification of U.S. Appl. No. 12/468,628, filed May 12, 2009.
Office Action issued in U.S. Appl. No. 10/038,883 on Nov. 1, 2005; 17 pages.
Office Action issued in U.S. Appl. No. 10/038,883 on Nov. 3, 2006; 16 pages.
Notice of Allowance issued in U.S. Appl. No. 10/038,883 on Mar. 7, 2007; 6 pages.
Notice of Allowance issued in U.S. Appl. No. 10/038,883 on Jun. 5, 2007; 6 pages.
Office Action issued in U.S. Appl. No. 11/819,690 on Oct. 1, 2007; 10 pages.
Office Action issued in U.S. Appl. No. 11/819,690 on Apr. 30, 2008; 11 pages.
Advisory Action issued in U.S. Appl. No. 11/819,690 on Jul. 25, 2008; 3 pages.
Notice of Allowance issued in U.S. Appl. No. 11/819,690 on Feb. 5, 2009; 6 pages.
Notice of Allowance issued in U.S. Appl. No. 11/529,246 on Apr. 7, 2010; 10 pages.
Notice of Allowance issued in U.S. Appl. No. 12/830,791 on Jan. 3, 2011; 8 pages.
Office Action issued in U.S. Appl. No. 12/468,624 on Oct. 5, 2011; 10 pages.
Office Action issued in U.S. Appl. No. 12/468,624 on Mar. 23, 2012; 11 pages.
Notice of Allowance issued in U.S. Appl. No. 12/468,624 on Jul. 20, 2012; 5 pages.
Notice of Allowance issued in U.S. Appl. No. 13/108,443 on Jul. 17, 2012; 9 pages.
Notice of Allowance issued in U.S. Appl. No. 13/108,443 on Oct. 24, 2012; 9 pages.
Office Action issued in U.S. Appl. No. 13/586,660 on Dec. 7, 2012; 5 pages.
Notice of Allowance issued in U.S. Appl. No. 13/586,660 on Feb. 21, 2013; 4 pages.
Notice of Allowance issued in U.S. Appl. No. 13/586,660 on Jan. 31, 2013; 6 pages.
Notice of Allowance issued in U.S. Appl. No. 13/617,051 on Mar. 19, 2013; 4 pages.
Office Action for corresponding U.S. Appl. No. 10/593,053 dated Dec. 27, 2010; 13 pages.
Office Action issued in U.S. Appl. No. 12/806,185 on Jan. 9, 2012; 7 pages.
Office Action issued in U.S. Appl. No. 12/806,185 on Oct. 1, 2012; 19 pages.
Office Action issued in U.S. Appl. No. 12/806,185 on Jul. 24, 2013; 11 pages.
Office action issued in U.S. Appl. No. 12/806,185 on Nov. 4, 2013, 14 pages.
Office action issued in U.S. Appl. No. 12/806,185 on Jan. 22, 2014, 14 pages.
Notice of Allowance issued in U.S. Appl. No. 12/801,978 on Jul. 18, 2012; 9 pages.
Office Action issued in U.S. Appl. No. 12/806,184 on Apr. 21, 2011; 7 pages.
Office Action issued in U.S. Appl. No. 12/589,547 on Oct. 7, 2011; 9 pages.
Office action issued in U.S. Appl. No. 13/619,762 on Aug. 21, 2013, 15 pages.
Office action issued in U.S. Appl. No. 13/619,762 on Oct. 24, 2013, 13 pages.
Office action issued in U.S. Appl. No. 13/619,762 on Jan. 8, 2014, 14 pages.
Office Action issued in Chinese Application No. 200810001919.7 on May 27, 2010; 12 pages.
Office Action issued in Chinese Application No. 200810001919.7 on Dec. 31, 2011; 8 pages.
Office Action issued in Chinese Application No. 200810001919.7 on Sep. 29, 2012; 10 pages.
Office Action issued in Chinese Application No. 200810001919.7 on Nov. 8, 2012; 6 pages.
Communication Pursuant to Article 96(2) EPC issued in European Application No. 02801256.5 on Nov. 21, 2006; 3 pages.
Communication Pursuant to Article 94(3) EPC issued in European Application No. 02801256.5 on Apr. 18, 2008; 3 pages.
Summons to Attend Oral Proceedings Pursuant to Rule 115(1) EPC issued in European Application No. 02801256.5 on Oct. 5, 2009; 3 pages.
Minutes of the Oral Proceedings before the Examining Division and Decision to Refuse a European Patent Application issued in European Application No. 02801256.5 on Feb. 4, 2010; 24 pages.
Summons to Attend Oral Proceedings Pursuant to Rule 115(1) EPC issued in European Application No. 02801256.5 on Mar. 27, 2013; 8 pages.
Extended European Search Report issued in European Application No. 10182868.9 on Sep. 20, 2011; 7 pages.
Communication Pursuant to Article 94(3) EPC issued in European Application No. 10182868.9 on Mar. 18, 2013; 5 pages.
Office Action issued in Japanese Application No. 2012-518709 on Jan. 21, 2014; 3 pages. No translation.
International Search Report issued in International Application No. PCT/CA02/01541 on Jan. 30, 2003; 3 pages.
Written Opinion issued in International Application No. PCT/CA02/01541 on Jun. 16, 2003; 6 pages.
International Preliminary Examination Report issued in International Application No. PCT/CA02/01541 on Sep. 11, 2003; 6 pages.
International Search Report and Written Opinion of the International Searching Authority issued in International Application No. PCT/CA2010/001046 on Dec. 30, 2010; 9 pages.
International Search Report and Written Opinion of the International Searching Authority issued in International Application No. PCT/CA2010/001530 on Feb. 2, 2011; 12 pages.
International Search Report and Written Opinion of the International Searching Authority issued in International Application No. PCT/CA2010/001529 on Jan. 27, 2011; 12 pages.

(56) References Cited

OTHER PUBLICATIONS

International Search Report and Written Opinion of the International Searching Authority issued in International Application No. PCT/CA2010/001042 on Sep. 17, 2010; 9 pages.
International Search Report and Written Opinion of the International Searching Authority issued in International Application No. PCT/CA2010/001045 on Nov. 15, 2010; 10 pages.
Notice of Allowance issued in U.S. Appl. No. 13/617,175 on Sep. 15, 2014.
Office Action issued in Chinese Application No. 201080039485.5 on Aug. 18, 2014; 6 pages. No translation.
Notice of Allowance issued in Japanese Application No. 2012-518709 on Sep. 1, 2014; 3 pages. No translation.

SCATTERED PILOT PATTERN AND CHANNEL ESTIMATION METHOD FOR MIMO-OFDM SYSTEMS

RELATED APPLICATIONS

This application is a continuation of U.S. application Ser. No. 13/765,523, filed on Feb. 12, 2013, which is itself is a is a continuation of U.S. application Ser. No. 13/586,660, filed on Aug. 15, 2012, and issued as U.S. Pat. No. 8,406,118 on Mar. 26, 2013, which is itself is a continuation of U.S. application Ser. No. 12/468,624, filed on May 19, 2009, and issued as U.S. Pat. No. 8,254,246 on Aug. 28, 2012, which is itself a continuation of U.S. application Ser. No. 11/819,690, filed on Jun. 28, 2007 and issued as U.S. Pat. No. 7,545,734 on Jun. 9, 2009, which is itself a continuation of U.S. application Ser. No. 10/038,883, filed on Jan. 8, 2002, which has issued as U.S. Pat. No. 7,248,559 on Jul. 24, 2007, and claims the benefit thereof, which itself claims the benefit of U.S. Provisional Application No. 60/329,509 filed Oct. 17, 2001, the contents of which are incorporated in its entirety herein by reference.

FIELD OF THE INVENTION

This invention relates to OFDM communication systems, and more particularly to a more efficient use of pilot symbols within such systems.

BACKGROUND OF THE INVENTION

Multiple Input Multiple Output-Orthogonal Frequency Division Multiplexing (MIMO-OFDM) is a novel highly spectral efficient technology used to transmit high-speed data through radio channels with fast fading both in frequency and in time.

In wireless communication systems that employ OFDM, a transmitter transmits data to a receiver using many sub-carriers in parallel. The frequencies of the sub-carriers are orthogonal. Transmitting the data in parallel allows the symbols containing the data to be of longer duration, which reduces the effects of multi-path fading. The orthogonality of the frequencies allows the sub-carriers to be tightly spaced, while minimizing inter-carrier interference. At the transmitter, the data is encoded, interleaved, and modulated to form data symbols. Overhead information is added, including pilot symbols, and the symbols (data plus overhead) are organized into OFDM symbols. Each OFDM symbol typically uses $2^n$ frequencies. Each symbol is allocated to represent a component of a different orthogonal frequency. An inverse Fast Fourier Transform (IFFT) is applied to the OFDM symbol (hence the preference of $2^n$ frequencies) to generate time samples of a signal. Cyclic extensions are added to the signal, and the signal is passed through a digital-to-analog converter. Finally, the transmitter transmits the signal to the receiver along a channel.

When the receiver receives the signal, the inverse operations are performed. The received signal is passed through an analog-to-digital converter, and timing information is then determined. The cyclic extensions are removed from the signal. The receiver performs an FFT on the received signal to recover the frequency components of the signal, that is, the data symbols. Error correction may be applied to the data symbols to compensate for variations in phase and amplitude caused during propagation of the signal along the channel. The data symbols are then demodulated, de-interleaved, and decoded, to yield the transmitted data.

In systems employing differential detection, the receiver compares the phase and/or amplitude of each received symbol with an adjacent symbol. The adjacent symbol may be adjacent in the time direction or in the frequency direction. The receiver recovers the transmitted data by measuring the change in phase and/or amplitude between a symbol and the adjacent symbol. If differential detection is used, channel compensation need not be applied to compensate for variations in phase and amplitude caused during propagation of the signal. However, in systems employing coherent detection the receiver must estimate the actual d phase and amplitude of the channel response, and channel compensation must be applied.

The variations in phase and amplitude resulting from propagation along the channel are referred to as the channel response. The channel response is usually frequency and time dependent. If the receiver can determine the channel response, the received signal can be corrected to compensate for the channel degradation. The determination of the channel response is called channel estimation. The inclusion of pilot symbols in each OFDM symbol allows the receiver to carry out channel estimation. The pilot symbols are transmitted with a value known to the receiver. When the receiver receives the OFDM symbol, the receiver compares the received value of the pilot symbols with the known transmitted value of the pilot symbols to estimate the channel response.

The pilot symbols are overhead, and should be as few in number as possible in order to maximize the transmission rate of data symbols. Since the channel response can vary with time and with frequency, the pilot symbols are scattered amongst the data symbols to provide as complete a range as possible of channel response over time and frequency. The set of frequencies and times at which pilot symbols are inserted is referred to as a pilot pattern. The optimal temporal spacing between the pilot symbols is usually dictated by the maximum anticipated Doppler frequency, and the optimal frequency spacing between the pilot symbols is usually dictated by the anticipated delay spread of multi-path fading.

The existing pilot-assisted OFDM channel estimation approaches are designed for conventional one transmitter system. With a scattered pilot arrangement, there are three classes of algorithms:

1-D frequency interpolation or time interpolation
Transformed frequency 1-D interpolation
Independent time and frequency 1-D interpolation The first class of algorithms is based on the pilot OFDM symbol (all the sub-carriers are used as the pilots) or comb-type of pilots. This approach shown in the flow chart of FIG. 1A is simple but only suitable for channels with high frequency selectivity or channels with high time fading. The method involves pilot extraction in the frequency domain (step 1A-1) followed by interpolation in time (step 1A-2), or interpolation in frequency (step 1A-3).

The second method shown in the flow chart of FIG. 1B is aimed for channels with slow Doppler fading and fast frequency fading. It improves the first method by using FFT to reconstruct the channel response back to time domain for noise reduction processing at the expense of FFT/IFFT computing for the channel estimation separately. The method begins with pilot extraction in the frequency domain (step 1B-1), which may be followed by interpolation in frequency (step 1B-2). Then an inverse fast Fourier transform (step 1B-3), smoothing/de-noise processing (step 1B-4), and finally a fast Fourier transform (1B-5) steps are executed.

The third method shown in the flow chart of FIG. 1C can be used to estimate channel for mobile applications, where both fast time fading and frequency fading exist. However it needs a relatively high density of pilots and a completed interpolator. This method involves pilot extraction in the frequency domain (step 1C-1) this is followed by interpolation in time (step 1C-2) and interpolation in frequency (step 1C-3).

In the propagation environment with both high frequency dispersion and temporal fading, the channel estimation performance can be improved by the increase of pilot symbol density at the price of the reduction of the spectral efficiency of the data transmission. To interpolate and reconstruct the channel response function from the limited pilots to achieve reliable channel estimation with the minimum overhead is a challenging task.

There are a variety of existing standard pilot patterns. In environments in which the channel varies only slowly with time and frequency, the pilot symbols may be inserted cyclically, being inserted at an adjacent frequency after each time interval. In environments in which the channel is highly frequency dependent, the pilot symbols may be inserted periodically at all frequencies simultaneously. However, such a pilot pattern is only suitable for channels that vary very slowly with time. In environments in which the channel is highly time dependent, the pilot symbols may be inserted continuously at only specific frequencies in a comb arrangement to provide a constant measurement of the channel response. However, such a pilot pattern is only suitable for channels that vary slowly with frequency. In environments in which the channel is both highly frequency and highly time dependent (for example, mobile systems with much multi-path fading), the pilot symbols may be inserted periodically in time and in frequency so that the pilot symbols form a rectangular lattice when the symbols are depicted in a time-frequency diagram.

In OFDM communication systems employing coherent modulation and demodulation, the receiver must estimate the channel response at the frequencies of all sub-carriers and at all times. Although this requires more processing than in systems that employs differential modulation and demodulation, a significant gain in signal-to-noise ratio can be achieved using coherent modulation and demodulation. The receiver determines the channel response at the times and frequencies at which pilot symbols are inserted into the OFDM symbol, and performs interpolations to estimate the channel response at the times and frequencies at which the data symbols are located within the OFDM symbol. Placing pilot symbols more closely together (in frequency if a comb pattern is used, in time if a periodic pattern is used, or in both frequency and in time if a rectangular lattice pattern is used) within a pilot pattern results in a more accurate interpolation. However, because pilot symbols are overhead, a tighter pilot pattern is at the expense of the transmitted data rate.

Existing pilot patterns and interpolation techniques are usually sufficient if the channel varies slowly with time (for example for nomadic applications). However, if the channel varies quickly with time (for example, for mobile applications), the time interval between pilot symbols must be reduced in order to allow an accurate estimation of the channel response through interpolation. This increases the overhead in the signal.

The problem of minimizing the number of pilot symbols while maximizing the accuracy of the interpolation is also particularly cumbersome in Multiple-Input Multiple-Output (MIMO) OFDM systems. In MIMO OFDM systems, the transmitter transmits data through more than one transmitting antenna and the receiver receives data through more than one receiving antenna. The binary data is usually divided between the transmitting antennae, although the same data may be transmitted through each transmitting antenna if spatial diversity is desired. Each receiving antenna receives data from all the transmitting antennae, so if there are M transmitting antennae and N receiving antennae, then the signal will propagate over M×N channels, each of which has its own channel response. Each transmitting antenna inserts pilot symbols into the same sub-carrier location of the OFDM symbol which it is transmitting. In order to minimize interference at the receiver between the pilot symbols of each transmitting antenna, each transmitting antenna typically blinks its pilot pattern on and off. This increases the temporal separation of the pilot symbols for each transmitter, reducing the accuracy of the interpolation used to estimate the channel response. In MIMO-OFDM systems a simple and fast channel estimation method is particularly crucial because of the limitation of the computational power for estimating M×N channels, while in SISO-OFDM system only one channel needs to be estimated.

SUMMARY OF THE INVENTION

Channel estimation methods are provided which are based on the partial interpolation of a scattered pilot by using true 2-D interpolation; and additionally, simple 1-D interpolation is used reconstruct the entire channels. This method has a reduced scattered pilot overhead, and is at least an order of magnitude less computationally complex than some existing methods. In general, the proposed method of channel estimation is more robust in channels with high Doppler spread, and provides better performance than some existing methods and requires the less buffering of the OFDM symbols for the coherent detection at the receiver than in some methods.

The methods allow fewer pilot symbols to be placed within each OFDM symbol, while still allowing accurate interpolation of the channel response. The data rate of an MIMO-OFDM system is thereby improved.

According to a first aspect of the invention, there is provided a method of inserting pilot symbols into Orthogonal Frequency Division Multiplexing (OFDM) frames transmitted on a plurality N of transmitting antenna, the OFDM frames having a time domain and a frequency domain, each OFDM frame comprising a plurality of OFDM symbols, the method comprising the steps of: for the N transmit antennas, transmitting sets of N pilot symbols, each set being in a location within a scattered pattern in time-frequency, each set of N pilot symbols comprising a pilot symbol for each antenna.

In some embodiments, transmitting sets of N pilot symbols, each set being in a location within a scattered pattern in time-frequency comprises: transmitting a set of N pilot symbols in a respective location within the scattered pattern on a same sub-carrier.

In some embodiments, for the N transmit antennas, transmitting sets of N pilot symbols, each set being in a location within a scattered pattern in time-frequency comprises: inserting sets of N pilot symbols at locations that form at least one diagonal arrangement in time-frequency.

In some embodiments, inserting sets of N pilot symbols comprises: when N is equal to two, for each antenna, alternating insertion of null symbol locations and pilot symbols in the at least one diagonal arrangement for a first antenna of the pair of antennas and alternating insertion of pilot symbols and null symbol locations in the at least one diagonal arrangement for a second antenna of the pair of antennas, wherein the null symbol locations of the first antenna correspond to a same location in time-frequency as the pilot symbols of the second antenna, and vice versa.

In some embodiments, the method further comprises for each location within a scattered pattern in time-frequency: generating a group of L uncoded pilot symbols; performing space time block coding (STBC) on the group of L uncoded pilot symbols to produce an N×N STBC block, L and N determining an STBC code rate; transmitting one row or column of the STBC block on each antenna on a specific sub-carrier.

In some embodiments, the method further comprises transmitting the sets of N pilot symbols with a power level greater than a power level of data symbols, depending upon a value reflective of channel conditions.

In some embodiments, the method further comprises transmitting the sets of N pilot symbols with a power level which is dynamically adjusted to ensure sufficiently accurate reception as a function of a modulation type applied to sub-carriers carrying data.

In some embodiments, transmitting sets of N pilot symbols, each set being in a location within a scattered pattern in time-frequency comprises: providing a first plurality of equally spaced sub-carrier positions; providing a second plurality of equally spaced sub-carrier positions offset from said first plurality; inserting the sets of N pilot symbols alternately in time using the first plurality of equally spaced sub-carrier positions and the second plurality of equally spaced sub-carrier positions.

In some embodiments, the second plurality of equally spaced sub-carrier positions is offset from the first plurality of equally spaced-subcarrier positions by half the spacing between adjacent sub-carriers of the first plurality of sub-carrier positions thereby forming a diamond shaped arrangement.

In some embodiments, the method further comprises inserting sets of N pilot symbols in an OFDM resource for an additional group of N transmitting antennas wherein transmitting sets of N pilot symbols in a respective pattern in time-frequency for the additional group of N transmitting antennas comprises: employing the same respective pattern of pilot symbols as the N transmitting antennas where N≥2, but offset in at least one of time and frequency.

According to a second aspect of the invention, there is provided a method comprising: providing a first transmitter implementing the method according to the first aspect of the invention; providing at least one other transmitter implementing the method according to the first aspect of the invention using scattered patterns offset from those used by the first transmitter.

According to a third aspect of the invention, there is provided a transmitter comprising: a plurality N of transmit antennas; an OFDM frame generator that inserts pilot symbols into Orthogonal Frequency Division Multiplexing (OFDM) frames transmitted on the plurality N of transmit antennas, the OFDM frames having a time domain and a frequency domain, each OFDM frame comprising a plurality of OFDM symbols, such that for the N transmit antennas, sets of N pilot symbols are transmitted, each set being in a location within a scattered pattern in time-frequency, each set of N pilot symbols comprising a pilot symbol for each antenna.

In some embodiments, a set of N pilot symbols in a respective location within the scattered pattern is transmitted on a same sub-carrier.

In some embodiments, the transmitter is further operable to, for each location in the scattered pattern: generate a group of L uncoded pilot symbols; perform space time block coding (STBC) on the group of L pilot symbols to produce an N×N STBC block; transmit one row or column of the STBC block on each antenna.

In some embodiments, the transmitter is further operable to transmit the sets of N pilot symbols with a power level greater than a power level of data symbols depending on a value reflective of channel conditions.

In some embodiments, the transmitter is further operable to transmit the sets of N pilot symbols with a power level which is dynamically adjusted to ensure sufficiently accurate reception.

In some embodiments, the OFDM frame generator is operable to: define a first plurality of equally spaced sub-carrier locations; define a second plurality of equally spaced sub-carrier locations offset from said first plurality; wherein the sets of N pilot symbols are inserted alternately in time using the first plurality of equally spaced sub-carrier locations and the second plurality of equally spaced sub-carrier locations.

In some embodiments, spacing between locations of the scattered pattern in time-frequency is optimized to allow a fast extraction of scattered pilot symbols without requiring the computation of a complete FFT.

According to a fourth aspect of the invention, there is provided a receiver comprising: a plurality N of receive antennas for receiving OFDM symbols comprising: sets of N pilot symbols transmitted from N antennas in a scattered pattern in time-frequency, the sets of N pilot symbols for each respective pattern in time-frequency inserted such that sets of N pilot symbols from different antennas do not occupy a same location in time-frequency; and data symbols in time-frequency; and a channel estimator for comparing the received sets of N pilot symbols with pilot symbol values known to be transmitted by a transmitter.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

The invention will now be described in greater detail with reference to the accompanying Figures, in which.

DETAILED DESCRIPTION OF THE PREFERRED EMBODIMENTS

The following sections describe a MIMO-OFDM transmitter/receiver and scattered pilot insertion. By way of introduction, a OFDM frame consists of the preamble OFDM symbols and regular OFDM symbols. Each OFDM symbol uses a set of orthogonal sub-carriers. When there are two transmit antennas, two OFDM symbols form a STTD block. For regular OFDM symbols, some sub-carriers are used as pilot sub-carriers to carry pilot symbols while the others are used as data sub-carriers to carry data symbols. The pilot sub-carriers are modulated by pilot symbols generated by QPSK. The data sub-carriers are modulated by complex data symbols generated by QAM mapping. STTD coding is applied to the pilot sub-carrier pairs located at the same frequency within one STTD block.

Figure 1A:
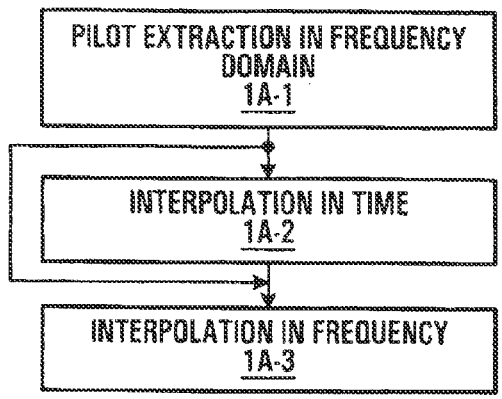
FIGS. 1A-1C illustrate flow-charts for three examples of conventional OFDM Channel Estimation.
Figure 1B:
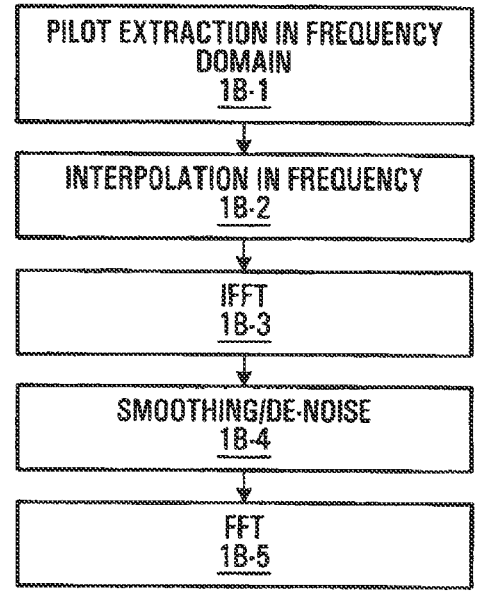
Figure 1C:
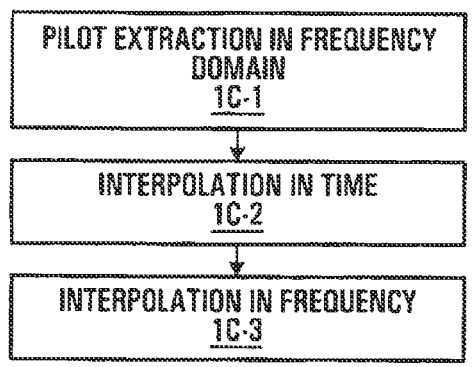
Figure 2:
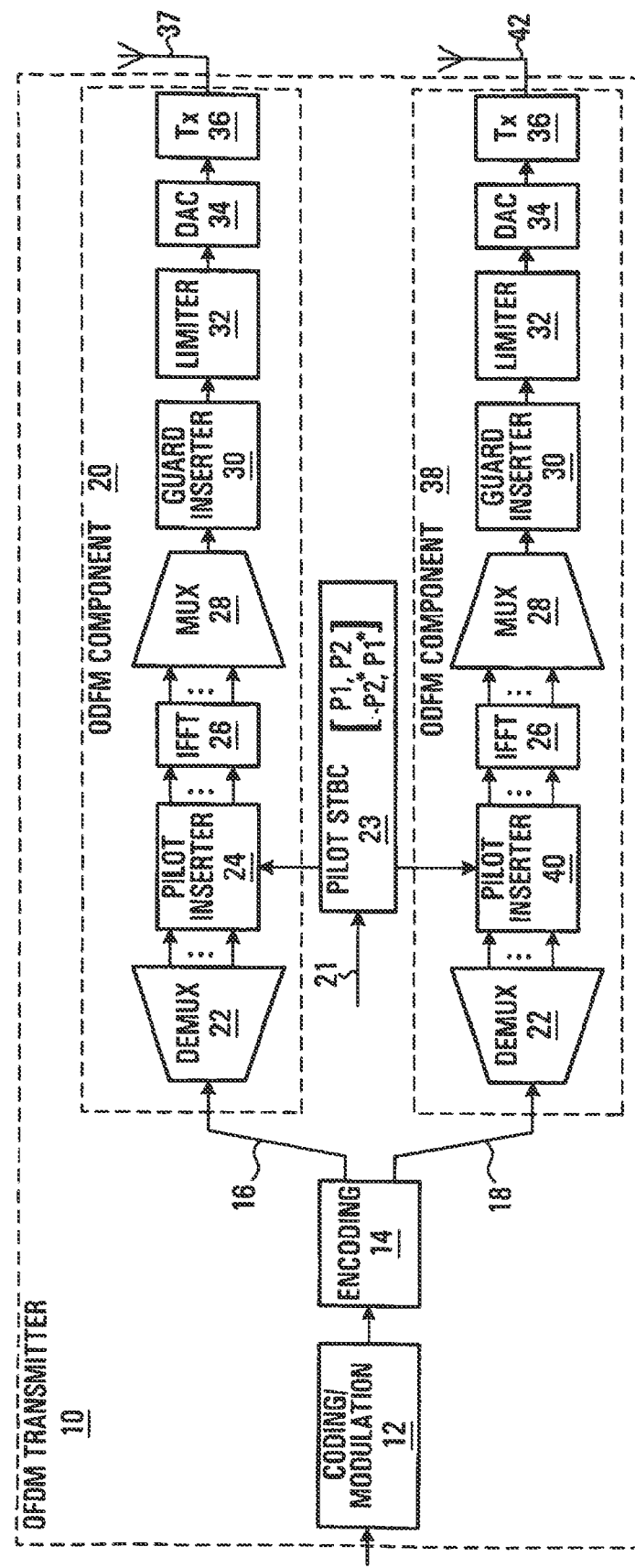
FIG. 2 is a block diagram of a Multiple-Input Multiple-Output Orthogonal Frequency Division Multiplexing (OFDM) transmitter provided by an embodiment of the invention.

Referring to FIG. 2, a block diagram of a Multiple-Input Multiple-Output (MIMO) Orthogonal Frequency Division Multiplexing (OFDM) transmitter provided by an embodiment of the invention is shown. The OFDM transmitter shown in FIG. 2 is a two-output OFDM transmitter, though more generally there may be a plurality of M transmitting antennae. An OFDM transmitter 10 takes binary data as input but data in other forms may be accommodated. The binary data is passed to a coding/modulation primitive 12 responsible for encoding, interleaving, and modulating the binary data to generate data symbols, as is well known to those skilled in the art. The coding/modulation primitive 12 may include a number of processing blocks, not shown in FIG. 2. An encoder 14 applies Space-Time Block Coding (SBTC) to the data symbols. The encoder 14 also separates the data symbols into a first processing path 16 and a second processing path 18, by sending alternate data symbols along each of the two processing paths. In the more general case in which the OFDM transmitter 10 includes M transmitting antennae, the encoder 14 separates the data symbols into M processing paths.

The data symbols sent along the first processing path 16 are sent to a first OFDM component 20. The data symbols are first passed to a demultiplexer 22 in the first OFDM component 20, after which the data symbols are treated as sub-carrier components. The data symbols are then sent to a pilot inserter 24, where pilot symbols are inserted among the data symbols. Collectively, the data symbols and pilot symbols are referred to hereinafter simply as symbols. The symbols are passed to an Inverse Fast Fourier Transform (IFFT) processor 26, then to a multiplexer 28 where they are recombined into a serial stream. A guard inserter 30 adds prefixes to the symbols. Finally, the OFDM signals are passed through a hard limiter 32, a digital-to-analog converter 34, and a radio frequency (RF) transmitter 36 which transmits OFDM symbols as a signal through a first transmitting antenna 37. In most embodiments, each element in the first OFDM component 20 is a processor, a component of a larger processor, or a collection of processors or any suitable combination of hardware, firmware and software. These might include general purpose processors, ASICs, FPGAs, DSPs to name a few examples.

The pilot inserter 24 is connected to receive space-time coded pilot symbols from pilot STBC function 23 which performs STBC on pilot symbols 21. The pilot STBC block 23 takes two pilot symbols at a time for example $P_1$ and $P_2$ as indicated in FIG. 2 and generates an STBC block consisting of a two by two matrix having $(P_1, P_2)$ in the first row and having $(-P_2^*, P_1^*)$ in the second row. It is the first row of this STBC block that is inserted by the pilot inserter 24.

The data symbols sent along the second processing path 18 are sent to a second OFDM component 38 which includes processors similar to those included in the first OFDM component 20. However, the pilot inserter 40 inserts encoded pilot symbols from the second row of the STBC block produced by the pilot STBC function 23. The symbols sent along the second processing path 18 are ultimately transmitted as a signal through a second transmitting antenna 42.

Figure 3:
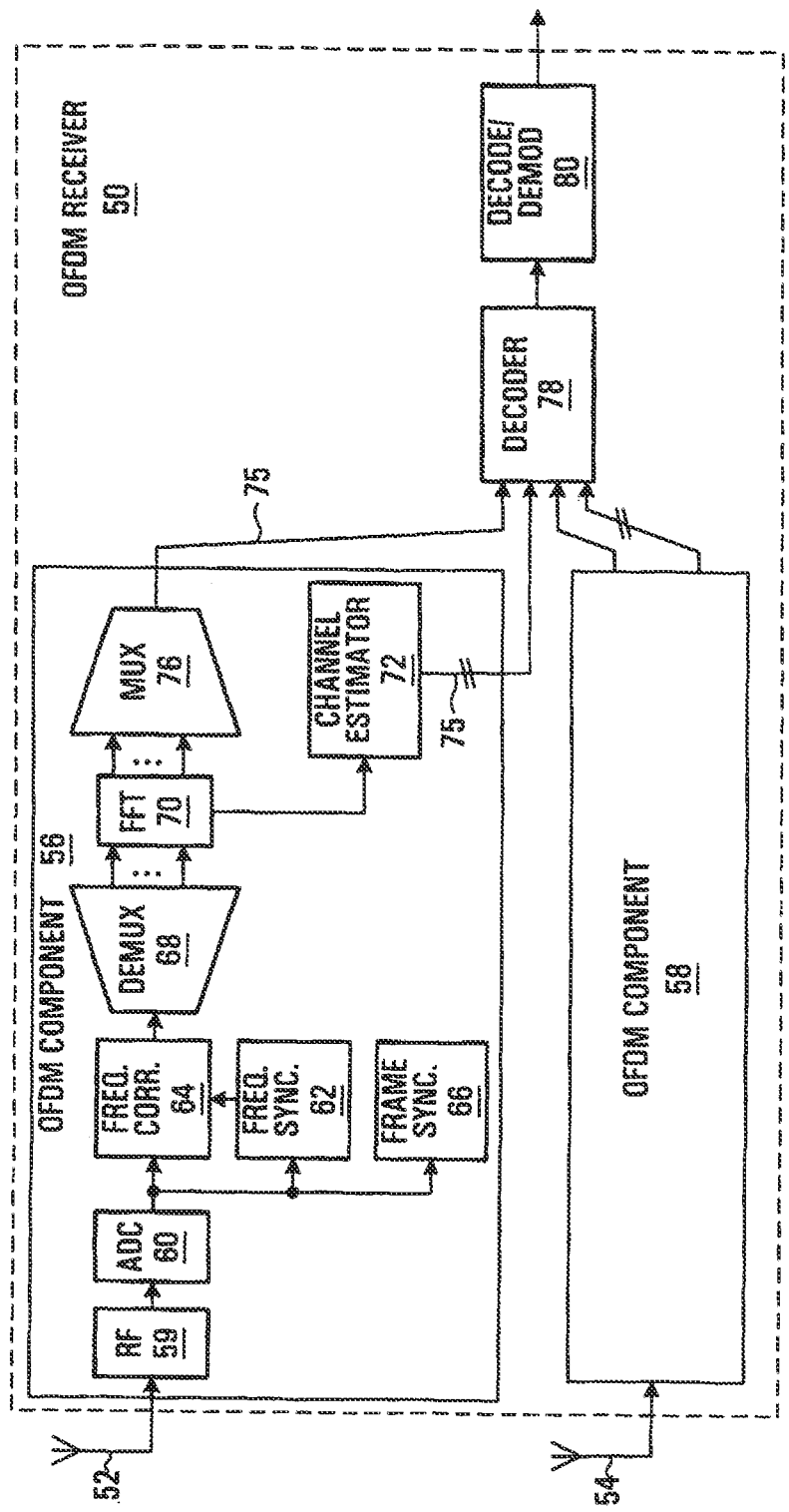
FIG. 3 is a block diagram of an OFDM receiver.

Referring now to FIG. 3, a block diagram of an MIMO-OFDM receiver is shown. An OFDM receiver 50 includes a first receiving antenna 52 and a second receiving antenna 54 (although more generally there will be one or more receiving antennae). The first receiving antenna 52 receives a first received signal. The first received signal is a combination of the two signals transmitted by the two transmitting antennae 37 and 42 of FIG. 2, although each of the two signals will have been altered by a respective channel between the respective transmitting antenna and the first receiving antenna 52. The second receiving antenna 54 receives a second received signal. The second received signal is a combination of the two signals transmitted by the two transmitting antennae 37 and 42 of FIG. 2, although each of the two signals will have been altered by a respective channel between the respective transmitting antenna and the second receiving antenna 54. The four channels (between each of the two transmitting antennae and each of the two receiving antennae) may vary with time and with frequency, and will usually be different from each other.

The OFDM receiver 50 includes a first OFDM component 56 and a second OFDM component 58 (although in general there will be N OFDM components, one for each receiving antenna). The first OFDM component 56 includes a RF receiver 59, and an analog-to-digital converter 60, which converts the first received signal into digital signal samples. The signal samples are passed to a frequency synchronizer 62 and a frequency offset corrector 64. The signal samples are also fed to a frame/time synchronizer 66. Collectively, these three components produce synchronized signal samples.

The synchronized signal samples represent a time sequence of data. The synchronized signal samples are passed to a demultiplexer 68, then passed in parallel to a Fast Fourier Transform (FFT) processor 70. The FFT processor 70 performs an FFT on the signal samples to generate estimated received symbols which are multiplexed in MUX 76 and sent as received symbols to decoder 78. Ideally, the received symbols would be the same as the symbols fed into the IFFT processor 26 at the OFDM transmitter 10. However, as the received signals will have likely been altered by the various propagation channels, the first OFDM component 56 must correct the received symbols by taking into account the channels. The received symbols are passed to a channel estimator 72, which analyses received pilot symbols located at known times and frequencies within the OFDM frame. The channel estimator 72 compares the received pilot symbols with what the channel estimator 72 knows to be the values of the pilot symbols as transmitted by the OFDM transmitter 10, and generates an estimated channel response for each frequency and time within the OFDM symbol. The estimated channel responses are passed to decoder 78. The channel estimator 72 is described in detail below.

The second OFDM component 58 includes similar components as are included in the first OFDM component 56, and processes the second received signal in the same manner as the first OFDM component 56 processes the first received signal. Each OFDM component passes OFDM symbols to the decoder 78.

The decoder 78 applies STBC decoding to the OFDM symbols, and passes the symbols to a decoding/demodulating primitive 80 responsible for decoding, de-interleaving, and demodulating the symbols to generate output binary data, as is well known to those skilled in the art. The decoding/demodulation primitive 80 which may include a number of additional processing blocks, not shown in FIG. 2. Each element in the OFDM components 56 and 58 is a processor, a component of a larger processor, or a collection of processors.

Figure 4:
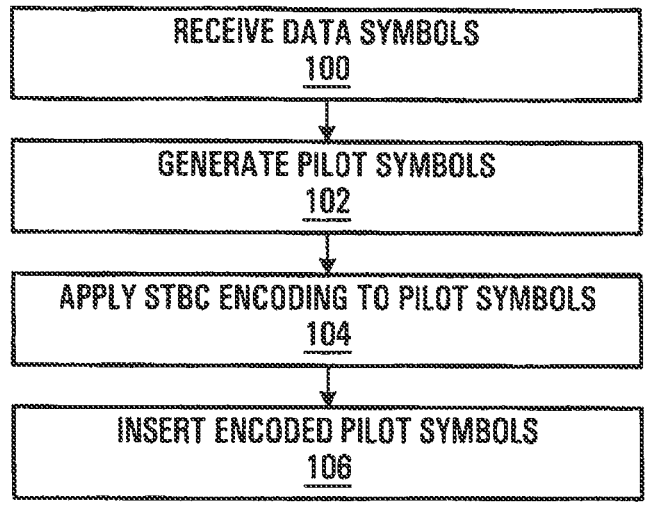
FIG. 4 is a flowchart of a method by which an OFDM transmitter inserts pilot symbols into an OFDM frame according to one embodiment of the invention.

Referring now to FIG. 4, a method by which each of the pilot inserters 24 and 40 of FIG. 2 inserts pilot symbols among the data symbols is shown. The method will be described with reference to the pilot inserter 24 in the first OFDM component 20. At step 100, the pilot inserter 24 receives data symbols from the demultiplexer 22. At step 102 the pilot STBC function 23 generates (or receives) two pilot symbols. At step 104 the pilot STBC function 23 applies STBC encoding to the pilot symbols, so as to generate an STBC block of encoded pilot symbols. The encoded pilot symbols generated for the first transmitting antenna 37 will be one row of the STBC block and will have a number equal to the number of transmitting antennae in the OFDM transmitter. Thus, for a two antenna system a 2×2 STBC block is generated.

At step 106 the pilot inserter 24 inserts the encoded pilot symbols within the OFDM symbol. Encoded pilot symbols are inserted in a diamond lattice pattern. The diamond lattice pattern uses the same frequencies as the other diamond lattice patterns, but has a temporal offset from the other diamond lattice patterns. Preferably, the temporal offset for each diamond lattice pattern is one symbol (in the time direction) from another diamond lattice pattern, so that the diamond lattice patterns use consecutive symbols in the time direction of the OFDM frame.

The diamond lattice pattern in which each encoded pilot symbol is inserted within the OFDM frame is preferably a perfect diamond lattice pattern. To achieve this, the encoded pilot symbol is inserted at each of a first subset of frequencies. The frequencies within the first subset of frequencies are spaced equally apart by a pilot spacing. The encoded pilot symbol is inserted at each of the first subset of frequencies for an STBC block (two OFDM symbols). At some later time, the encoded pilot symbols are inserted at each of a second subset of frequencies. The frequencies within the second subset of frequencies are shifted from the frequencies within the first subset of frequencies by half of the pilot spacing within the frequency direction. The pilot inserter 24 continues to insert encoded pilot symbols, alternating between the first subset of frequencies and the second subset of frequencies.

Alternatively, a different pilot pattern can be used, as long as the same pilot pattern is used for each of the at least one encoded pilot symbols unique to the transmitting antenna 37, and as long as the pilot patterns for the encoded pilot symbols are offset from each other in the time direction of the OFDM frame. For example, a regular diagonal lattice pattern may be used, the diamond shaped lattice being a special case of this.

The pilot inserter 40 inserts pilot symbols using the same method, although the pilot symbols will be the other half of the STBC block 42. The encoded pilot symbols unique to the second transmitting antenna 42 are inserted in the OFDM frame at the same symbol locations at which the encoded pilot symbols corresponding to the first transmitting antenna 37 are inserted.

Figure 5:
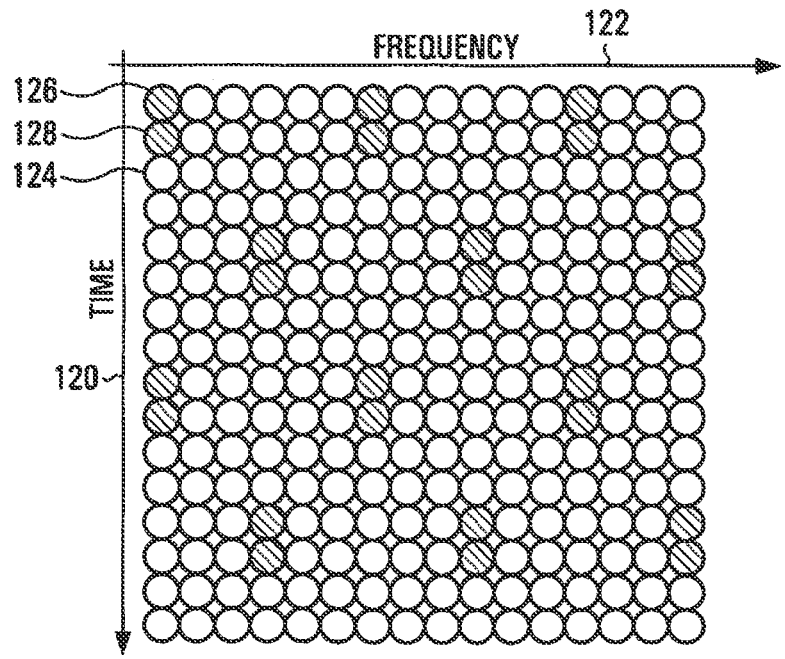
FIG. 5 is a diagram of a pilot pattern generated using the method of FIG. 4.

Referring to FIG. 5, an example pilot pattern generated using the method of FIG. 4 is shown. Pilot and data symbols are spread over the OFDM frame in a time direction 120 and a frequency direction 122. Most symbols within the OFDM frame are data symbols 124. A first set of encoded pilot symbols 126 corresponding to the first transmitting antenna 37 is inserted in a diamond lattice pattern. A second set of encoded pilot symbols 128 corresponding to the first transmitting antenna 37 is inserted in a diamond lattice structure at the same frequencies as the first set of encoded pilot symbols, but offset by one OFDM symbol location in the time direction 120. In the illustrated example two of every four OFDM symbols carry encoded pilot symbols. Each other transmitting antenna transmits using the same pattern. The pairs of consecutive pilot symbols on a sub-carrier consist of two raw pilot symbols STBC encoded. The same pattern is transmitted by the second antenna.

The power of the encoded pilot symbols 126, 128 may be increased compared to the traffic data symbol 124. The power increase of the encoded pilot can be dynamically adjusted with respect to the transmitting data symbol power level or modulation type (QAM size), or as a function of channel quality. The location of diamond lattice pattern may also be optimized to allow a fast extraction of scattered pilot without using the computing. This may be achieved if the pilot sub-carriers are spaced in the frequency direction by $2^n$. In the multiple base station transmission arrangement, the location of the diamond lattice pattern can be cyclic offset both in time direction and in frequency direction amongst adjacent base stations to form a diamond lattice re-use pattern.

Referring now to FIGS. 6 to 10, a channel estimation method is described which is based on the pilot insertion method above. This invention presents a simple 2-dimensional channel interpolator for MIMO-OFDM system with low pilot density for fast fading channels both in time and in frequency. The goal of channel estimation is to estimate the channel characteristics for each sub-carrier and at each time for each possible transmit antenna, receive antenna combination. Referring to FIG. 13, for the two transmit antenna, two receive antenna example, shown are two transmit antennas Tx1 140 and Tx2 142 and two receive antennas Rx1 144 and Rx2 146. Channel estimation estimates a channel for each sub-carrier and at each time between Tx1 140 and Rx1 144 indicated as each $H_{11}$ 148, a channel between Tx1 140 and Rx2 146 indicated by transfer function $H_{12}$ 150, a channel estimate for transmitter Tx2 142 to Rx1 144 indicated as transfer function $H_{22}$ 152 and finally, a channel estimate for transmitter Tx2 142 to receiver Rx2 146 indicated as transfer function $H_{21}$ 154.

Some advantages for the proposed method compared to some existing methods are: (1) robust to high mobility-speed (2) a reduction of the scattered pilot grid density and therefore a reduction of the pilot overhead.

Let $P_1$ and $P_2$ be the two pilot symbols encoded in an STBC block and transmitted by two antennas on one sub-carrier in consecutive OFDM symbols. Then at the first receive antenna, the following relationship exists for each sub-carrier on which pilot symbols are transmitted, where it is assumed the channel response $H_{ij}$ is constant over two OFDM frames:

$$\begin{bmatrix} Y_{1,1} \\ Y_{1,2} \end{bmatrix} = \begin{bmatrix} P_1 & P_2 \\ -P_2^* & P_1^* \end{bmatrix} \begin{bmatrix} H_{11} \\ H_{21} \end{bmatrix}$$

$Y_{1,1}$ is the received data on the first antenna on the sub-carrier in the first of the two consecutive OFDM symbols, and $Y_{1,2}$ is the received data on the first antenna on the sub-carrier in the second of the two consecutive symbols. This can be solved for $H_{11}$, $H_{21}$ to yield:

$$\begin{bmatrix} H_{11} \\ H_{21} \end{bmatrix} = \frac{1}{|P_1|^2 + |P_2|^2} \begin{bmatrix} P_1^* & -P_2 \\ P_2^* & P_1 \end{bmatrix} \begin{bmatrix} Y_{1,1} \\ Y_{1,2} \end{bmatrix}$$

A similar process for the second antenna yields $$\begin{bmatrix} H_{12} \\ H_{22} \end{bmatrix} = \frac{1}{|P_1|^2 + |P_2|^2} \begin{bmatrix} P_1^* & -P_2 \\ P_2^* & P_1 \end{bmatrix} \begin{bmatrix} Y_{2,1} \\ Y_{2,2} \end{bmatrix}$$

where $Y_{2,1}$ is the received data on the second antenna on the sub-carrier in the first of the two consecutive OFDM symbols, and $Y_{2,2}$ is the received data on the second antenna on the sub-carrier in the second of the two consecutive OFDM symbols.

Using this techniques, a channel estimate is made for each pilot sub-carrier, and for each pair of OFDM symbols used to transmit STBC blocks.

For the example of FIG. 12, the result is a channel estimate, for each of the possible channels (these are for channels in this example as shown in FIG. 13) for each pair of pilot symbols transmitted. This is illustrated in FIG. 14 where only sub-carriers used to transmit pilots are shown. A channel estimate 150 is generated for each pair of (consecutive in time) OFDM frames for each pilot sub-carrier. This results in channel estimates 150, 152, 154 for the first and second frames, and channel estimates 156, 158, 160 for the fifth and sixth frames and so on.

Figure 7:
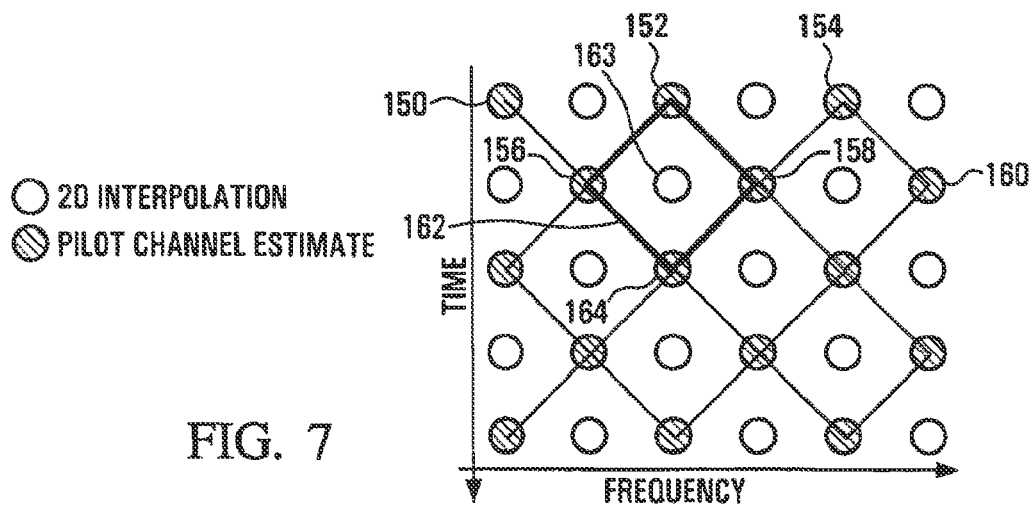
FIG. 7 is a time frequency diagram showing channel estimate positions for pilot channel estimation.
Figure 8:
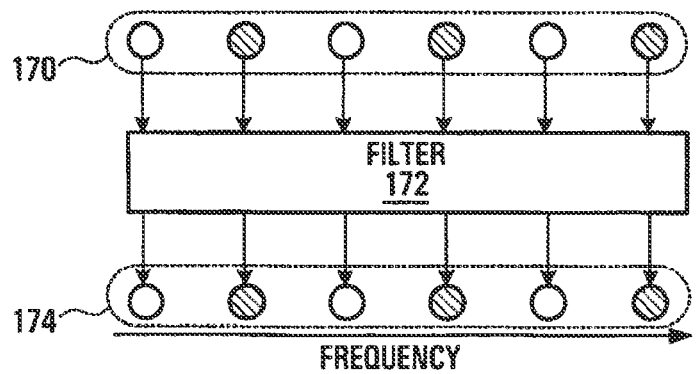
FIG. 8 schematically illustrates a step of filtering estimated and interpolated pilot channel estimates.

The channel estimates are made on a STBC block by block basis so that the pattern of channel estimate shown in FIG. 7 develops over time. The next step in the process is to perform an interpolation based on the channel estimate of FIG. 7 to obtain channel estimates for the places in FIG. 7 which do not represent pilot channel positions. The manner in which this is done will be described for a single example, namely the unknown channel estimate indicated at 163 of FIG. 7. Channel estimates are buffered on an ongoing basis and when the four channel estimates 152, 156, 158 and 164 forming a diamond 162 surrounding the unknown channel estimate 163 have been computed, it is time to interpolate to obtain a channel estimate for the unknown point 163. The channel transfer function at the sub-carrier located at the centre of the diamond can be obtained from a simple 4 points two-dimensional interpolator. Three points two-dimensional interpolators can be used to obtain the channel estimates corresponding to the first or last useful sub-carrier:

$$H_{new}(n+1, k) =$$

$$\frac{1}{4}(H(n, k) + H(n+2, k) + H(n+1, k-1) + H(n+1, k+1))$$

where $$(k = 2, \ldots, N_{pilot} - 1)$$

$$H_{new}(n+1, 1) = \frac{1}{4}(H(n, 1) + H(n+2, 1) + 2H(n+1, 2))$$

$$H_{new}(n+1, N_{pilot}) =$$

$$\frac{1}{4}(H(n, N_{pilot}) + H(n+2, N_{pilot}) + 2H(n, N_{pilot} - 1))$$

where k is the pilot sub-carrier index, n is the channel estimate index (or STBC block number—one channel estimate per sub-carrier for every two symbols), and $N_{pilot}$ is the number of pilot sub-carriers (6 in the example of FIG. 7). $H_{new}$ is the newly interpolated channel estimate for the $i^{th}$ channel estimation period, and the $j^{th}$ pilot sub-carrier. H(i, j) is the channel estimate determined as described previously from the pilot symbols. A three points interpolator would also be performed for the last STBC blocks in the OFDM frame (i.e. the last two OFDM symbols).

These calculations are done for each transmit antenna, receiver antenna combination. It is noted that this is just one example of how the channel estimates can be interpolated.

If the original distance between pilot sub-carriers in the frequency direction is $D_f$, after first step of interpolation described above, the pilot sub-carriers' separation becomes $$\frac{D_f}{2}.$$

Figure 6:
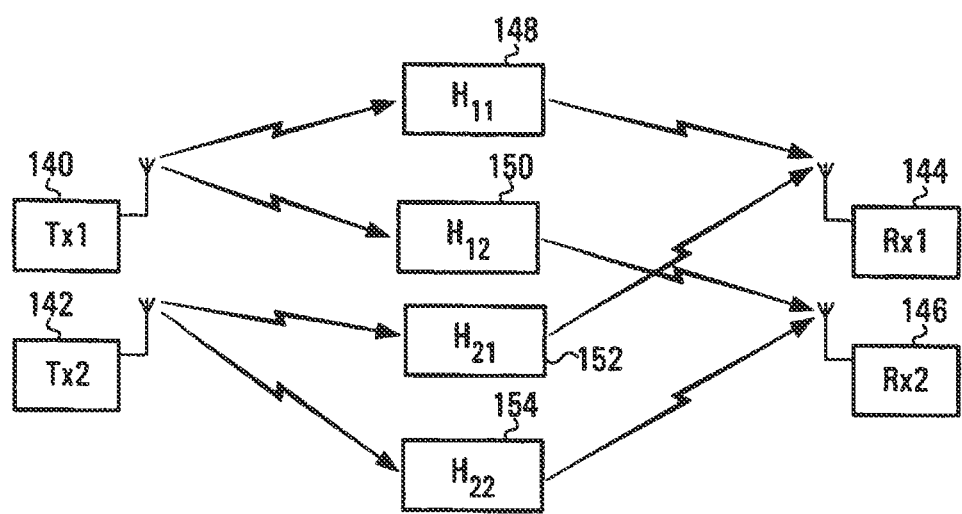
FIG. 6 is a block diagram of a MIMO system showing the channel transfer functions between two transmit antennas and two receive antennas.

In some embodiments, to remove noise, the channel estimates thus computed are filtered at each channel estimation period. This is shown in FIG. 6 where the channel estimates 170 for one channel estimation period are shown entering filter 172 to produce filtered channel estimates. For example, a simple 3 point moving iterative smoothing algorithm may be applied to H':

$$H'_{sm}(n, k) = H'_{sm}(n, k-1) + \frac{1}{3}(H'(n, k+1) + H'_{sm}(n, k-2))$$

where k=3, . . . , 2 $N_{pilot}$-2. It is to be understood that other filtering algorithms may be employed.

After the interpolation of the pilot channel estimate as summarized in FIG. 7, there will be a channel estimate for each sub-carrier on which pilot channel information was transmitted and for each two OFDM symbol period over which pilot channeling information was transmitted. Referring to FIG. 5, this means that there will be a channel estimate for each antenna for time frequency points which are shaded to indicate that pilot channel information was transmitted. There will also be channel estimates for the time frequency point in the centre of the diamond shaped lattice structure of FIG. 7. However, for points which are not pilot symbol transmission time-frequency points nor points which are at the centre of a diamond shaped lattice of such points, there will be no channel estimate yet computed. The next step is to perform a further interpolation step to develop channel estimates for these other points.

In some embodiments, Cubic Lagrange interpolation and linear interpolation (for the sub-carriers near the first and the last useful sub-carrier) in the frequency direction are used to obtain the channel transfer function at all sub-carriers for each STBC block (for each pair of OFDM symbols).

The coefficients of the Cubic Lagrange interpolator can be calculated as $$\mu(i) = \frac{i}{D_f / 2}$$

$$q_{-1}(\mu) = -\frac{1}{6}\mu^3 + \frac{1}{2}\mu^2 - \frac{1}{3}\mu$$

$$q_0(\mu) = \frac{1}{2}\mu^3 - \mu^2 - \frac{1}{2}\mu + 1$$

$$q_1(\mu) = -\frac{1}{2}\mu^3 + \frac{1}{2}\mu^2 + \mu$$

$$q_2(\mu) = -\frac{1}{6}\mu^3 - \frac{1}{6}\mu$$

$$i = 1, 2, \ldots, \frac{D_f}{2}$$

The channel transfer functions at data sub-carriers are given by $$H_{interp}\left((j-1)\cdot\frac{D_f}{2} + i\right) = \sum_{n=-1}^{2} q_n(\mu(i)) \cdot H'_{sm}(j+n)$$

where j=2, . . . , $N_{pilot}$-2.

Figure 9:
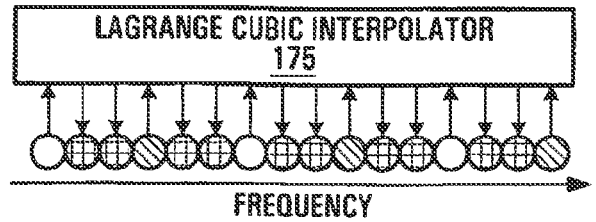
FIG. 9 shows schematically the step of interpolating between the channel estimates previously determined to provide channel estimates for all sub-carriers and all times.

This is illustrated in FIG. 9 where the estimated channel responses are fed to the Legrange cubic interpolator function 175 which outputs values for all intermediate sub-carriers. Other interpolations may alternatively be employed.

In some embodiments, every OFDM symbol contains some pilot insertion points and as such this completes the interpolation process. In other embodiments, there are some OFDM symbols which do not have any pilot insertion points. To get channel estimates for these OFDM symbols, an interpolation in time of the previously computed channel estimates is performed. In high mobility applications, pilots should be included in every OFDM symbol avoiding the need for this last interpolation in time step.

Figure 10:
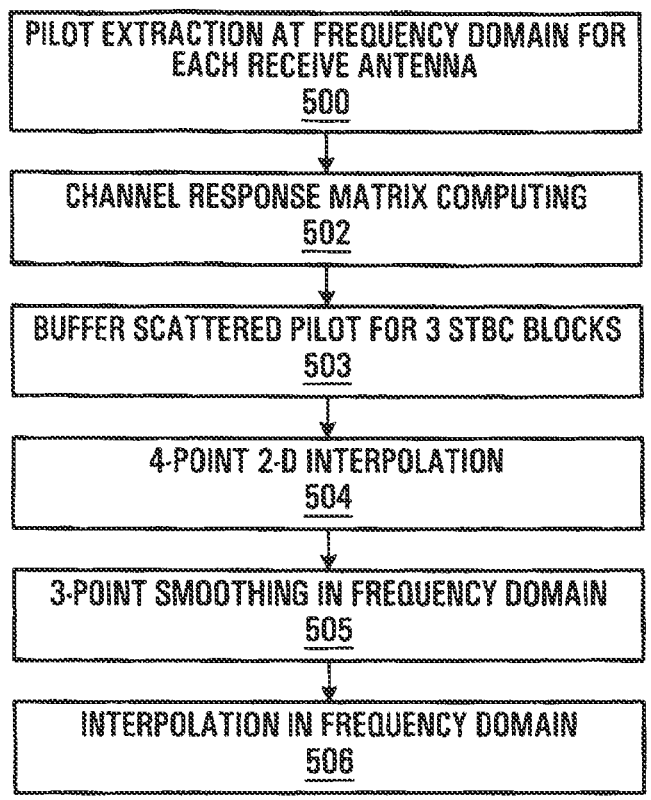
FIG. 10 is a flow chart summarizing the overall channel estimation method provided by an embodiment of the invention.

FIG. 10 presents an overall block diagram of the interpolation method proposed for two transmit antennas. An example set of performance results for the proposed MIMO-OFDM channel estimation algorithm is shown in FIG. 10. The performance of the 2-D channel estimation algorithm is close to the performance of ideal channel (only 0.5 dB loss) at very high Doppler spread.

Referring now to FIGS. 10 and 3, the channel estimation method is carried out by the channel estimator 72 in order to estimate a channel response for each sub-carrier and each OFDM symbol within an OFDM frame. The channel estimation method starts at step 500 by extracting the pilot symbols in the frequency domain for each receive antenna. This is followed by a channel response matrix computing step 502; whereby the received signal received by the receiving antenna is decoded, which in effect performs a time average of the encoded pilot symbols at each point in the pilot pattern. For example, suppose the receiving antenna receives an OFDM frame having a pilot pattern as shown in FIG. 5 (although the symbol 126 will now be a linear combination of the encoded pilot symbol transmitted at this location by each of the transmitting antenna, and the symbol 128 will be a linear combination of the encoded pilot symbol transmitted at this location by each of the transmitting antenna). Following decoding, the pilot symbol at symbol location 126 will be an average of the pilot symbol received at symbol location 126 and the pilot symbol received at symbol location 128. The time averaging effect produced by the STBC decoding, during step 503, can be viewed as a pre-processing step, as can steps 500 and 502.

The actual channel estimation method can be described broadly in four steps. Following step 503, during step 504 the channel estimator 72 estimates the channel response for each of a plurality of pilot symbols. For a diamond lattice pattern, the plurality of pilot symbols will be four pilot symbols forming a single diamond pattern. The channel estimator 72 estimates the channel response of a central symbol, the central symbol having a time direction value and a frequency direction value bounded by the time direction values and the frequency direction values of the plurality of pilot symbols. The central symbol preferably has a frequency direction value equal to the frequency direction values of two of the plurality of pilot symbols, and has a time direction value midway between the time direction values of the two pilot symbols having the same frequency direction value as the central symbol. This can generally be described as a four-point 2-D interpolation of the channel response between pilot symbols. Third, the channel estimator 72 smoothes the channel responses (corresponding to both encoded pilot symbols and to the central symbol) in the frequency direction, preferably by performing a three-point smoothing, as per step 505. Fourth, the channel estimator 72 performs an interpolation in the frequency direction to estimate the channel response for remaining symbols, as per step 506. The interpolation may be a linear interpolation for symbols having a frequency direction value equal to a first or a last useful sub-carrier within the OFDM symbol, and a cubic Lagrange interpolation otherwise.

The method of inserting pilot symbols (described above with reference to FIG. 4) and the channel estimation method (described above with reference to FIG. 10) need not be used together. Any channel estimation method may be used by the OFDM receiver to estimate the channel responses for an OFDM frame containing encoded pilot symbols inserted using the method described above. However, due to the sparse distribution of the pilot symbols in the pilot pattern described above with reference to FIG. 4 and FIG. 5, a two-dimensional interpolation method is preferable over a one-dimensional interpolation method. Similarly, the channel estimation method may be applied to an OFDM frame containing any pattern of pilot symbols.

The invention has been described with respect to an MIMO-OFDM communication system. The invention may also be used with advantage in a single input-multiple output OFDM communication system, as the method of inserting pilot symbols (described with reference to FIG. 4) and the channel estimation method (described with reference to FIG. 10) do not depend on the number of receiving antenna. Each receiving antenna within the OFDM receiver 50 performs channel estimation independently, regardless of the number of receiving antennae present.

Figure 11:
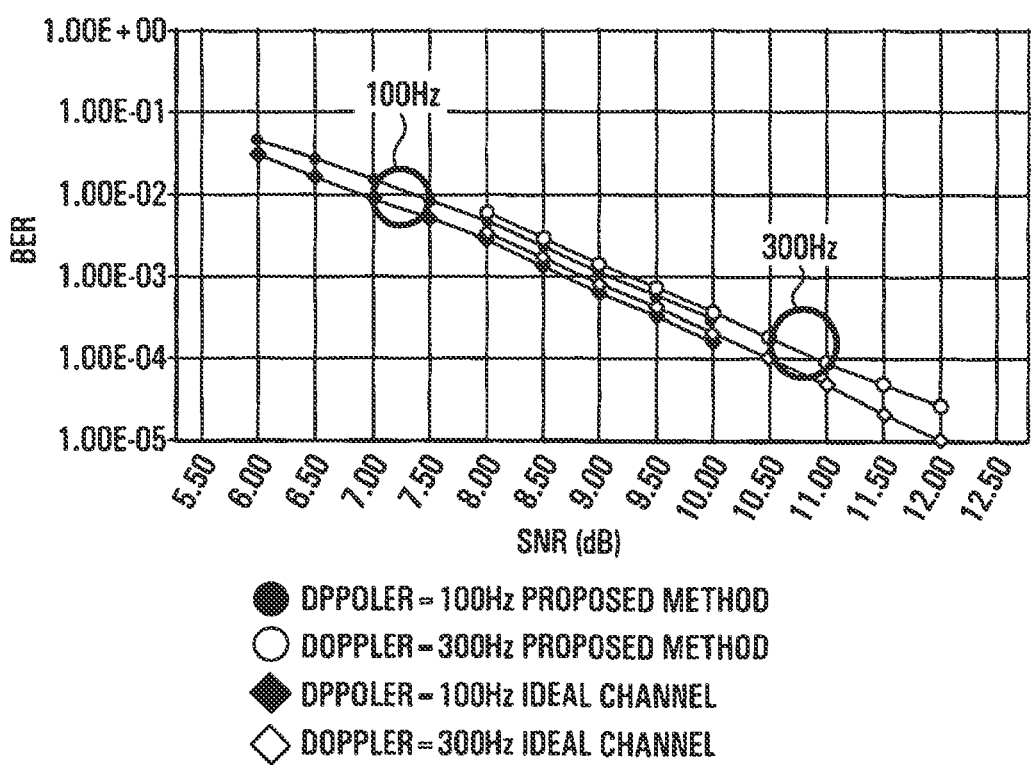
FIG. 11 is an example of a set of performance results obtained using the method of FIG. 10.

The channel estimation method described with reference to FIG. 10 will also be advantageous in an OFDM communication system having only one transmitting antenna, as the method provides an improved interpolation of the channel response regardless of the number of transmitting antenna. The method of inserting pilot symbols described with reference to FIG. 11 may be used in an OFDM communication system having only one transmitting antenna, but will not be as advantageous as in an OFDM communication system having more than one transmitting antenna as there will be no reduction in overhead.

The method of inserting pilot symbols and the channel estimation method are preferably implemented on the OFDM transmitter and on the OFDM receiver respectively in the form of software instructions readable by a digital signal processor. Alternatively, the methods may be implemented as logic circuitry within an integrated circuit. More generally, any computing apparatus containing logic for executing the described functionality may implement the methods. The computing apparatus which implements the methods (in particular the pilot inserter or the channel estimator) may be a single processor, more than one processor, or a component of a larger processor. The logic may comprise external instructions stored on a computer-readable medium, or may comprise internal circuitry.

What has been described is merely illustrative of the application of the principles of the invention. Other arrangements and methods can be implemented by those skilled in the art without departing from the spirit and scope of the present invention.

We claim:

1. A method of inserting pilot symbols into Orthogonal Frequency Division Multiplexing, OFDM, frames at an OFDM transmitter having at least two transmitting antennas, the OFDM frames having a time domain and a frequency domain, each OFDM frame comprising a plurality of OFDM symbols in the time domain and a plurality of sub-carriers in the frequency domain, the method comprising the steps of:
   for a first antenna of the OFDM transmitter, inserting scattered pilot symbols in a scattered pattern in time-frequency by inserting a first set of pilot symbols in a first pattern in time-frequency and inserting a second set of pilot symbols in a second pattern in time-frequency at the same frequencies as the first pattern, offset by one OFDM symbol in the time domain; and
   for a second antenna of the OFDM transmitter, inserting scattered pilot symbols using the same scattered pattern.

2. A method according to claim 1, wherein each pilot symbol of the first set of pilot symbols is spaced six sub-carriers apart.

3. A method according to claim 1, wherein the scattered pattern is a regular diagonal-shaped lattice.

4. A method according to claim 3, wherein the regular diagonal shaped lattice is a diamond shaped lattice.

5. A method of claim 1, further comprising transmitting the pilot symbols with a power level which is dynamically adjusted as a function of a modulation type applied to the sub-carriers carrying data.

6. A method according to claim 3, wherein the regular diagonal-shaped lattice pattern comprises:
   a first plurality of equally spaced sub-carrier positions;
   a second plurality of equally spaced sub-carrier positions offset from said first plurality;
   wherein the pilot symbols are inserted alternately in time using the first plurality of equally spaced sub-carrier positions and the second plurality of equally spaced sub-carrier positions.

7. An apparatus, comprising:
   an Orthogonal Frequency Division Multiplexing, OFDM, transmitter having at least two transmit antennas, the OFDM transmitter being adapted to insert pilot symbols into OFDM frames having a time domain and a frequency domain, each OFDM frame comprising a plurality of OFDM symbols in the time domain and a plurality of sub-carriers in the frequency domain, and configured to:
      insert, using a first antenna of the OFDM transmitter, scattered pilot symbols in a scattered pattern in time-frequency by inserting a first set of pilot symbols in a first pattern in time-frequency and inserting a second set of pilot symbols in a second pattern in time-frequency at the same frequencies as the first pattern, offset by one OFDM symbol in the time domain; and
      insert, using a second antenna of the OFDM transmitter, scattered pilot symbols using the same scattered pattern.

8. The apparatus according to claim 7, wherein the pilot symbols are transmitted with a power level greater than a power level of data symbols.

9. The apparatus according to claim 8, wherein the pilot symbols are transmitted with a power level greater than a power level of data symbols depending on a value reflective of channel conditions.

10. The apparatus according to claim 7, further comprising an OFDM receiver configured to receive scattered pilot symbols in the scattered pattern for each transmitting antenna.

11. A User Equipment (UE), comprising:
one or more processors configured to:
receive, from a first antenna of an OFDM transmitter, scattered pilot symbols in a scattered pattern in time-frequency, wherein the scattered pattern includes a first set of pilot symbols in a first pattern in time-frequency and a second set of pilot symbols in a second pattern in time-frequency at the same frequencies as the first pattern, offset by one OFDM symbol in the time domain; and
receive, from a second antenna of the OFDM transmitter, scattered pilot symbols using the same scattered pattern.

12. The UE according to claim 11, wherein each pilot symbol of the first set of pilot symbols is spaced six sub-carriers apart.

13. The UE according to claim 11, wherein the scattered pattern is a regular diagonal-shaped lattice.

14. The UE according to claim 13, wherein the regular diagonal shaped lattice is a diamond shaped lattice.

15. The UE according to claim 11, one or more processors further configured to receive the pilot symbols with a power level which is dynamically adjusted as a function of a modulation type applied to the sub-carriers carrying data.

16. The UE according to claim 13, wherein the regular diagonal-shaped lattice pattern comprises:
a first plurality of equally spaced sub-carrier positions;
a second plurality of equally spaced sub-carrier positions offset from said first plurality; and
wherein the pilot symbols are inserted alternately in time using the first plurality of equally spaced sub-carrier positions and the second plurality of equally spaced sub-carrier positions.

17. A method, comprising:
receiving, from a first antenna of an OFDM transmitter, scattered pilot symbols in a scattered pattern in time-frequency, wherein the scattered pattern includes a first set of pilot symbols in a first pattern in time-frequency and a second set of pilot symbols in a second pattern in time-frequency at the same frequencies as the first pattern, offset by one OFDM symbol in the time domain; and
receiving, from a second antenna of the OFDM transmitter, scattered pilot symbols using the same scattered pattern.

18. The method according to claim 17, wherein each pilot symbol of the first set of pilot symbols is spaced six sub-carriers apart.

19. The method according to claim 17, wherein the scattered pattern is a regular diagonal-shaped lattice.

20. The method according to claim 19, wherein the regular diagonal shaped lattice is a diamond shaped lattice.

21. The method according to claim 17, further comprising receiving the pilot symbols with a power level which is dynamically adjusted as a function of a modulation type applied to the sub-carriers carrying data.

22. The method according to claim 19, wherein the regular diagonal-shaped lattice pattern comprises:
a first plurality of equally spaced sub-carrier positions;
a second plurality of equally spaced sub-carrier positions offset from said first plurality; and
wherein the pilot symbols are inserted alternately in time using the first plurality of equally spaced sub-carrier positions and the second plurality of equally spaced sub-carrier positions.

23. A method of inserting pilot symbols into Orthogonal Frequency Division Multiplexing, OFDM, frames at an OFDM transmitter having at least two transmitting antennas, the OFDM frames having a time domain and a frequency domain, each OFDM frame comprising a plurality of OFDM symbols in the time domain and a plurality of sub-carriers in the frequency domain, the method comprising the steps of:
for a first antenna of the OFDM transmitter, inserting scattered pilot symbols in a scattered pattern in time-frequency by inserting pilot symbols corresponding to the first antenna in a first pattern in time-frequency; and
for a second antenna of the OFDM transmitter, inserting scattered pilot symbols using the scattered pattern by inserting pilot symbols corresponding to the second antenna, wherein the pilot symbols for the first antenna correspond to a first code and the pilot symbols for the second antenna correspond to a second code.

24. A device for inserting pilot symbols into Orthogonal Frequency Division Multiplexing, OFDM, frames at an OFDM transmitter having at least two transmitting antennas, the OFDM frames having a time domain and a frequency domain, each OFDM frame comprising a plurality of OFDM symbols in the time domain and a plurality of sub-carriers in the frequency domain, comprising:
a first antenna of the OFDM transmitter;
a second antenna of the OFDM transmitter; and
one or more processors configured to:
for a first antenna of the OFDM transmitter, insert scattered pilot symbols in a scattered pattern in time-frequency by inserting pilot symbols corresponding to the first antenna in a first pattern in time-frequency; and
for a second antenna of the OFDM transmitter, insert scattered pilot symbols using the scattered pattern by inserting pilot symbols corresponding to the second antenna, wherein the pilot symbols for the first antenna correspond to a first code and the pilot symbols for the second antenna correspond to a second code.

25. A non-transitory computer readable medium for inserting pilot symbols into Orthogonal Frequency Division Multiplexing, OFDM, frames at an OFDM transmitter having at least two transmitting antennas, the OFDM frames having a time domain and a frequency domain, each OFDM frame comprising a plurality of OFDM symbols in the time domain and a plurality of sub-carriers in the frequency domain, the computer readable medium storing instructions to cause a processor to perform operations comprising:
for a first antenna of the OFDM transmitter, inserting scattered pilot symbols in a scattered pattern in time-frequency by inserting pilot symbols corresponding to the first antenna in a first pattern in time-frequency; and
for a second antenna of the OFDM transmitter, inserting scattered pilot symbols using the scattered pattern by inserting pilot symbols corresponding to the second antenna, wherein the pilot symbols for the first antenna correspond to a first code and the pilot symbols for the second antenna correspond to a second code.

\* \* \* \* \*